United States Patent

Takenaka

[11] Patent Number: 5,974,018
[45] Date of Patent: Oct. 26, 1999

[54] APPARATUS FOR AND METHOD OF RECORDING INFORMATION ON RECORDING MEDIA

[75] Inventor: Yoshihiko Takenaka, Tokorozawa, Japan

[73] Assignee: Pioneer Electronic Corporation, Tokyo-to, Japan

[21] Appl. No.: 08/960,036

[22] Filed: Oct. 29, 1997

[30] Foreign Application Priority Data

Oct. 30, 1996 [JP] Japan .................................. 8-303876

[51] Int. Cl.$^6$ ............................. G11B 3/64; G11B 17/22; G11B 3/90
[52] U.S. Cl. ................................. 369/84; 369/32; 369/58
[58] Field of Search ................................... 369/30, 32, 33, 369/47, 48, 53, 54, 58, 84, 85; 360/6, 15

[56] References Cited

U.S. PATENT DOCUMENTS

| | | | |
|---|---|---|---|
| 5,295,126 | 3/1994 | Okano et al. ......................... | 369/84 X |
| 5,610,888 | 3/1997 | Hiranuma ............................. | 369/84 X |
| 5,889,747 | 3/1999 | Hisamatsu et al. ....................... | 369/84 |

*Primary Examiner*—Paul W. Huber
*Attorney, Agent, or Firm*—Young & Thompson

[57] ABSTRACT

An information recording apparatus includes a receiving unit for receiving an information to be recorded on recording media, and the information includes a plurality of unit information. The first recording unit records the unit information successively on a first recording medium. The detecting unit detects dividing points of the unit information. The second recording unit records the unit information on a second recording medium. The second recording unit records the unit information from a recording start position of the second recording medium every time when the detecting unit detects the dividing points.

9 Claims, 6 Drawing Sheets

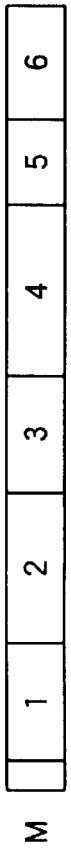
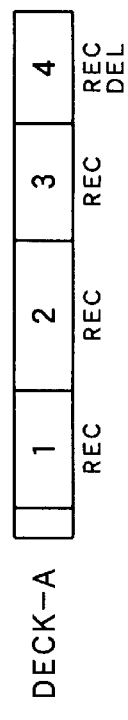
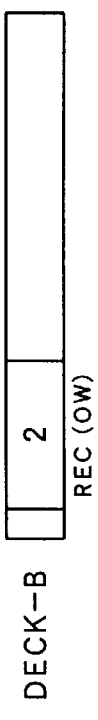
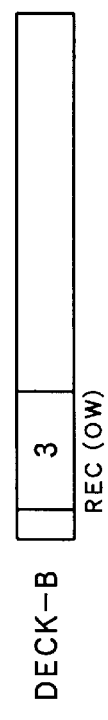
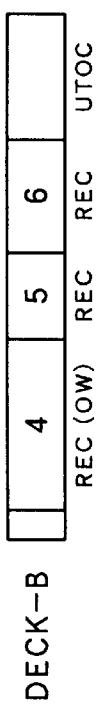
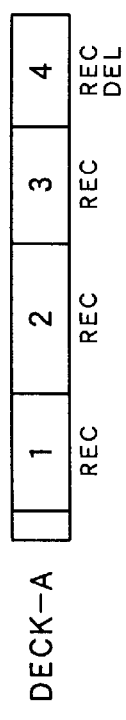
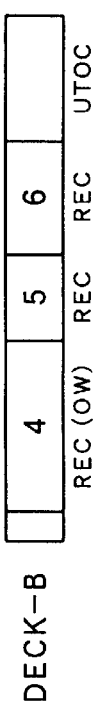
FIG. 3A  M
FIG. 3B  DECK-A
FIG. 3C  DECK-B
FIG. 3D  DECK-B
FIG. 3E  DECK-B
FIG. 3F  DECK-B
FIG. 3G  DECK-A
FIG. 3H  DECK-B
FIG. 3I  DECK-B

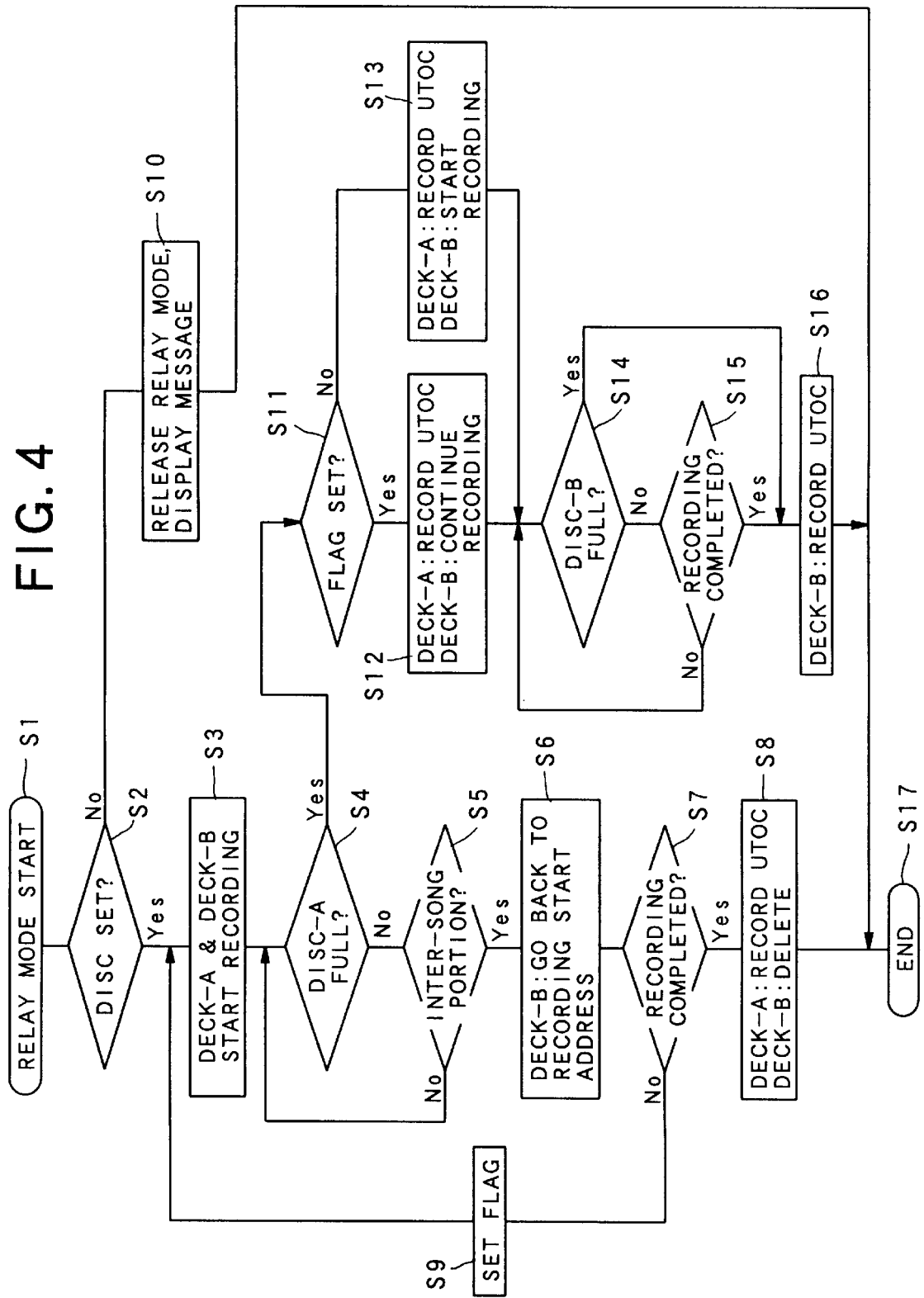

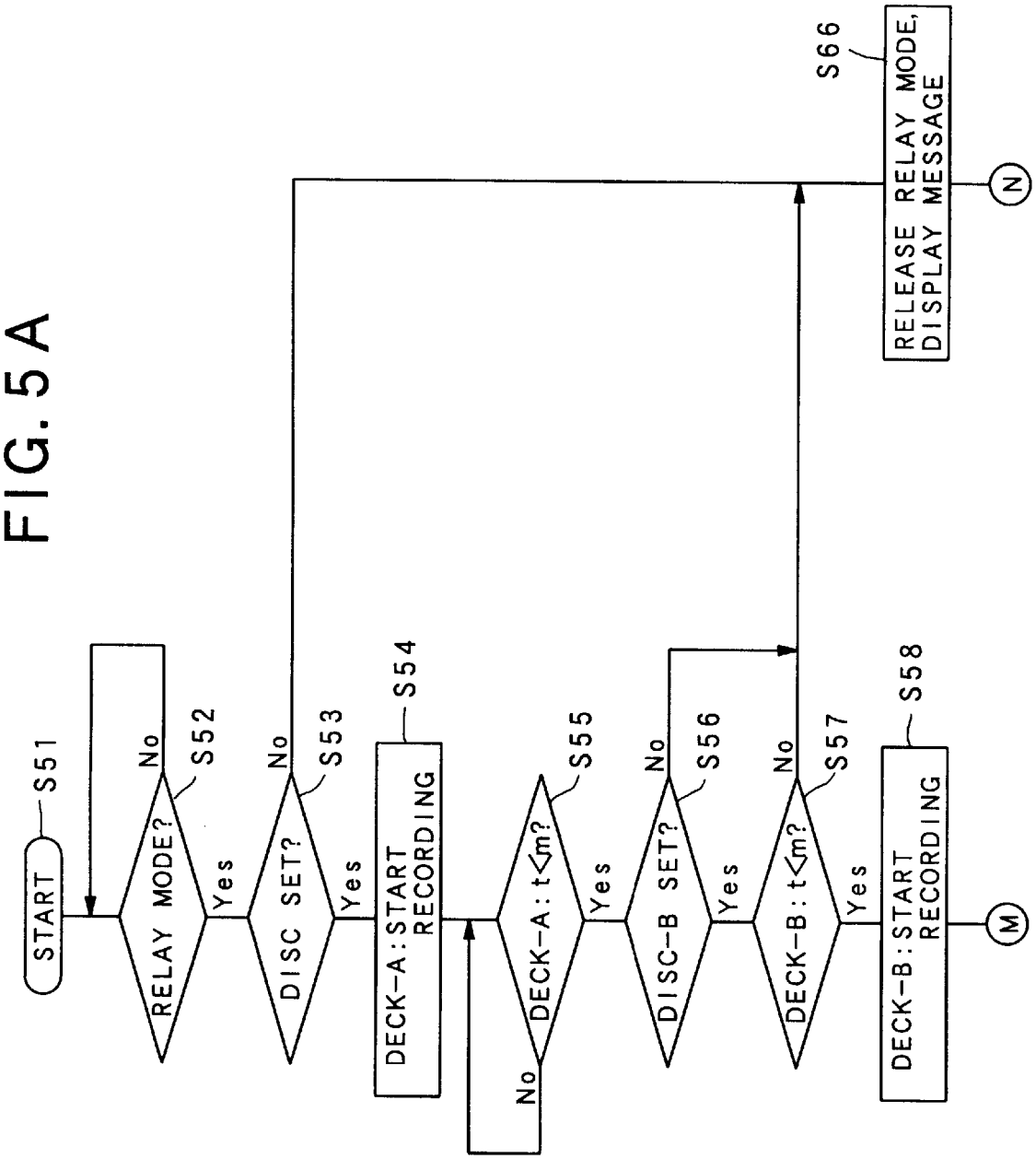

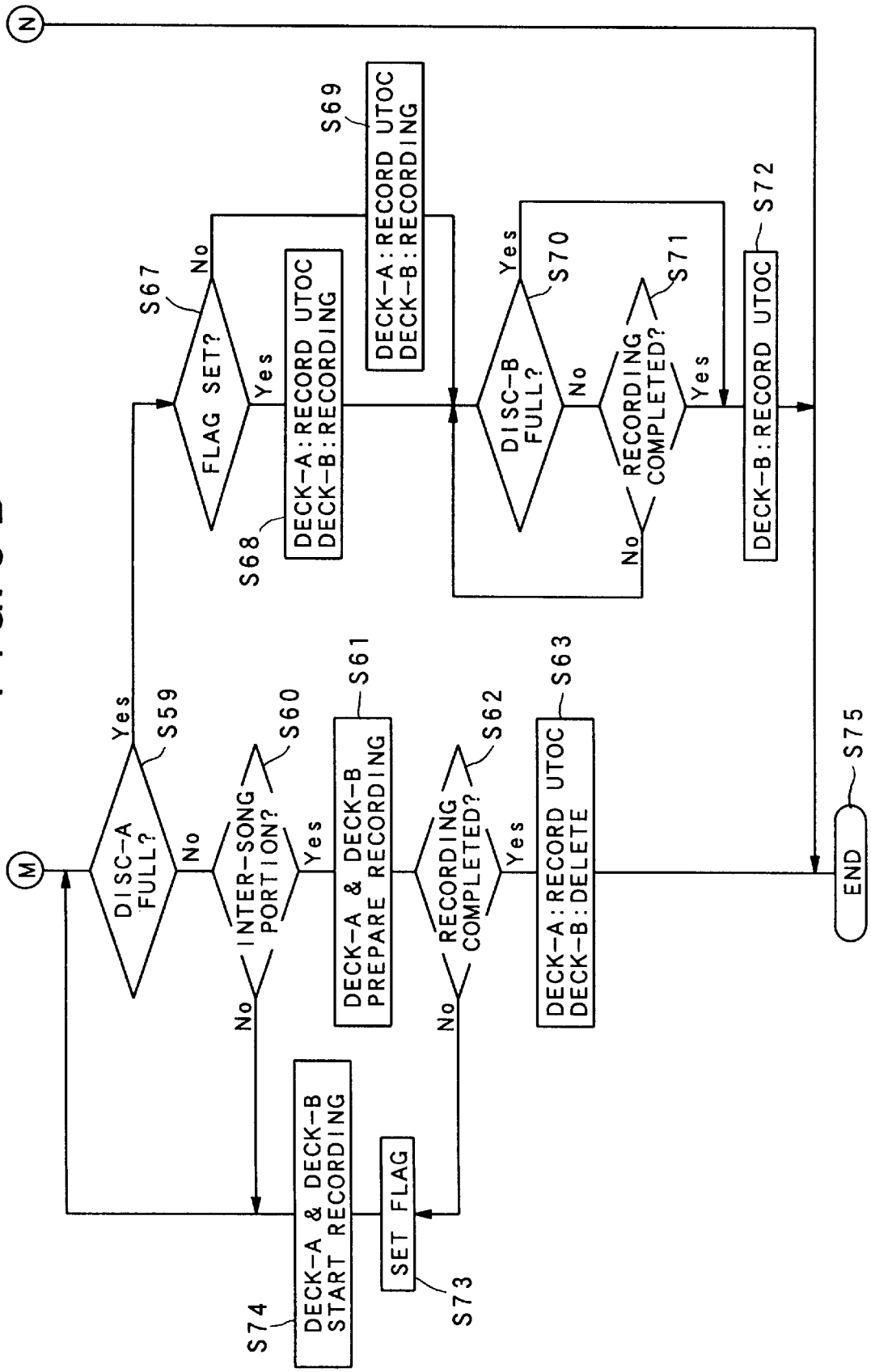

APPARATUS FOR AND METHOD OF RECORDING INFORMATION ON RECORDING MEDIA

BACKGROUND OF THE INVENTION

1. Field of the Invention

The present invention relates to an information recording apparatus and method for recording information on a plurality of recording media.

2. Description of the Prior Art

For recording and reproducing music information, there has generally been broadly used a cassette tape type recording medium. Particularly, in the case of recording long music information or a plurality of music information, so-called double cassette deck apparatus, which is equipped with two cassette deck portions, is broadly used. In these days, in addition to the cassette tape system, an MD (Mini-Disc) system is getting popular. MD is used with a magneto-optical recording and reproducing apparatus, and is characterized by its small size, light weight, remarkably quick accessibility in reproduction and insusceptibility to erroneous jump due to external shocks because of an internal shock-proof memory. It is expected that new functions making the best use of the above advantages are developed.

FIG. 1 is a block diagram illustrating the configuration of an information recording and reproducing apparatus for use with MD. The MD 21 includes a magneto-optical disc body having a magnetic layer, and a cartridge (not shown) for protecting the magneto-optical disc body. When installed in the information recording and reproducing apparatus, the MD 21 is held by the spindle motor 1 by means of a magnet. The pickup 4 includes the optical head 3 which irradiates a laser beam onto the rotating magneto-optical disc and receives a return beam from the disc to obtain an RF (Radio Frequency) signal, and is carried by the carriage 14 movable in the radial direction of the disc. The magnetic field modulating head 2, which applies the magnetic field modulation to the magnetic layer of the disc to record information thereon, is also movable in the radial direction of the disc by means of the head driver 5. The servo controller 8 controls the performances of the driving systems of the spindle motor 1, the pickup 4 and the carriage 14.

At the time of reproducing information from a recordable MD, the RF signal is amplified to a certain level by the RF amplifier 7, and the address decoder 6 detects the wobbling frequency from the RF signal, thereby making it possible to detect the position on the disc with respect to time, even if no information has been recorded thereon. The EFM encoder/decoder 9 extracts the EFM signal from the RF signal amplified by the RF amplifier 7 at the time of reproduction, and converts the information to be recorded into the EFM signal to control the output of the magnetic field modulating head 2 at the time of recording. The DRAM controller 11 temporarily writes the information read out from the disc into the DRAM 12 at the speed about five times larger than the data reading speed, according to so-called FIFO (First-In-First-Out) method, to control the data writing and reading by the DRAM 12.

The analog signal supplied from an external device at the time of recording is converted into the digital signal by the ADC (Analog-to-Digital Converter) 15, and is then compressed by the data compression encoder/decoder 13 such that the data amount is reduced to ⅕ of its original amount by utilizing the audibility threshold characteristic and masking effect. On the other hand, the signal read out from the MD 21 at the time of reproduction and then EFM demodulated by the EFM encoder/decoder 9 is subject to the data expansion by the data compression encoder/decoder 13, and then converted to the analog signal by the DAC (Digital-to-Analog Converter) 16 to be outputted. The system controller 30 functions to control each components in the information recording and reproducing apparatus. The system controller 30 also receives the signal from the key input unit 18 which receives operational instructions from users (from external), and controls the display unit 17 which displays information recording and/or reproducing condition of the apparatus.

At present, there is a need for a player system employing two MD decks like the double cassette player mentioned above. It is of course desired to achieve an effective use of the two MD decks in recording information on the MD. For example, in the case of recording many songs on two or more MDs or recording radio broadcasting program for which the playing time of the songs are generally unknown, the user has to manually operate, by himself, the recording apparatus with close attention to appropriately record the songs without interruption or break of the recorded song.

SUMMARY OF THE INVENTION

It is an object of the present invention to provide an information recording apparatus and method, such as MD system capable of quick access onto the recording medium, which are capable of efficiently recording information using plural recording media with easy operation.

According to one aspect of the present invention, there is provided an information recording apparatus including: a receiving unit for receiving an information to be recorded on recording media, the information including a plurality of unit information; a first recording unit for recording the unit information successively on a first recording medium; a detecting unit for detecting dividing points of the unit information; and a second recording unit for recording the unit information on a second recording medium, the second recording unit recording the unit information from a recording start position of the second recording medium every time when the detecting unit detects the dividing points.

In accordance with the information recording apparatus thus configured, the unit information is successively recorded on the first recording medium while the second recording unit records the unit information from a recording start position of the second recording medium every time when the detecting unit detects the dividing points. Therefore, the information can be efficiently recorded on a plurality of recording media.

Preferably, the second recording unit may record the unit information by overwriting a new unit information over the unit information which has been recorded on the second recording medium. Further, it is preferred that the apparatus is further provided with a confirming unit for confirming that the unit information is completely recorded on the first recording medium, and the second recording unit starts recording the unit information after the confirmation by the confirming unit is made.

According to a preferred embodiment, the first recording unit and the second recording unit may start recording simultaneously.

It is preferred that the apparatus further includes a determining unit for determining that the first recording medium becomes full by the recorded unit information, and the second recording unit records the unit information successively one after another after the determining unit determines that the first recording medium becomes full.

According to a preferred embodiment, the second recording unit may start recording when a remaining recordable amount of the first recording medium becomes less than a predetermined amount. Alternatively, the second recording unit may start recording when a remaining recordable time of the first recording medium becomes less than a predetermined time.

According to another aspect of the present invention, there is provided a method of recording information on recording media including the steps of: (a) receiving information including a plurality of unit information; (b) simultaneously starting recording of the unit information on a first recording medium and a second recording medium from recording start positions of the first recording medium and the second recording medium, respectively; (c) detecting dividing points of the unit information; and (d) moving a recording position of the unit information on the second recording medium to the recording start position of the second recording medium to record next unit information from the recording start position every time when the detecting step detects the dividing points.

In accordance with the information recording apparatus thus configured, the unit information is successively recorded on the first recording medium while the unit information is recorded on the second recording medium from a recording start position of the second recording medium every time when the dividing points are detected. Therefore, the information can be efficiently recorded on a plurality of recording media.

Preferably, the method may further include the step of confirming that the unit information is completely recorded on the first recording medium, and the moving step may move the recording position on the second recording medium to the recording start position after the confirmation is made by the confirming step.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A to 3I schematically show a recording manner of information on MDs according to the present invention.

FIG. 4 is a flowchart showing a first information recording method according to the present invention.

FIGS. 5A and 5B are flowchart showing a second information recording method according to the present invention.

DETAILED DESCRIPTION OF THE PREFERRED EMBODIMENTS

The preferred embodiments of the present invention will now be described below with reference to the attached drawings.

Figure 1:
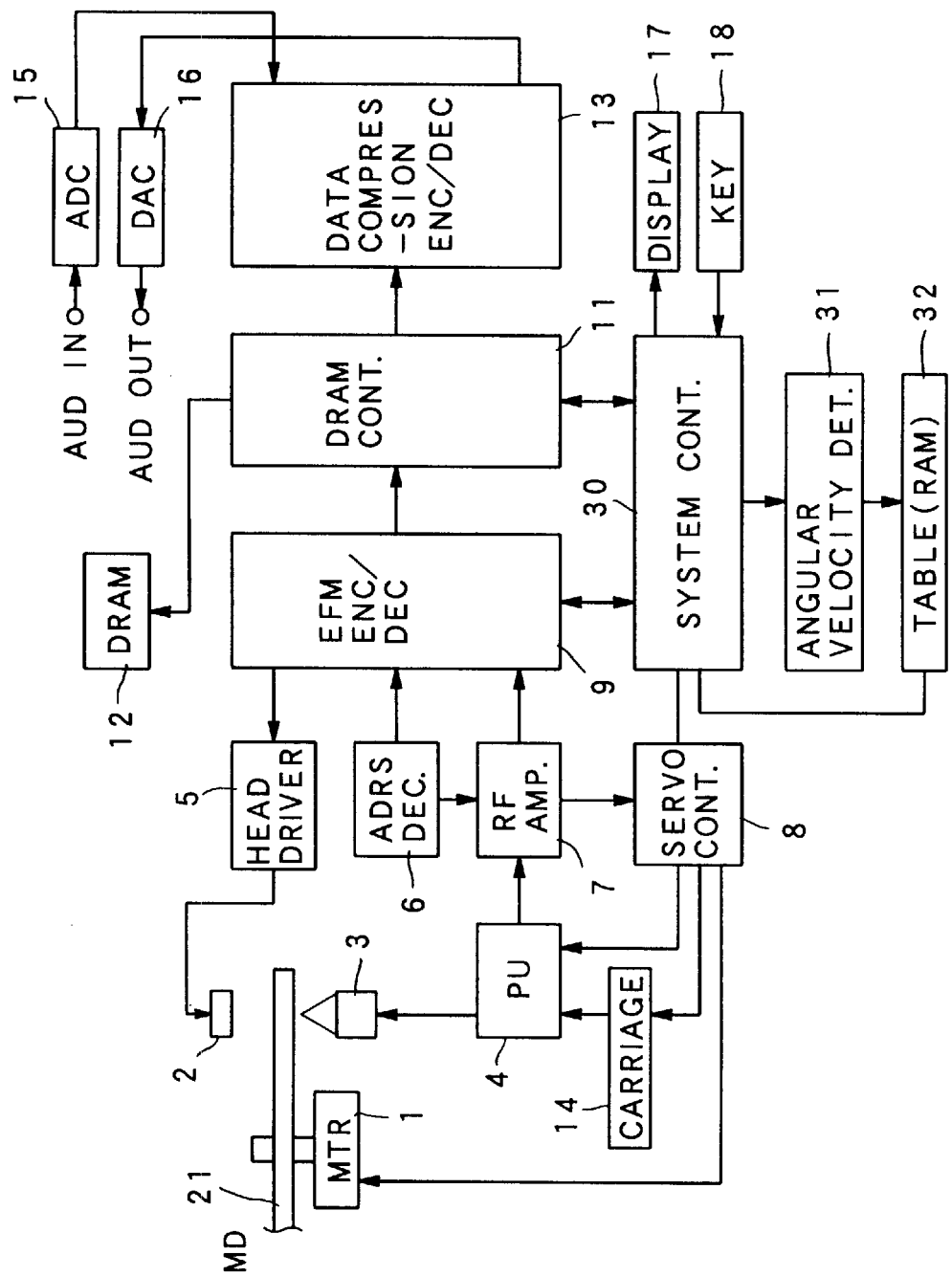
FIG. 1 is a block diagram illustrating the configuration of an information recording and reproducing apparatus for use with MD.
Figure 2:
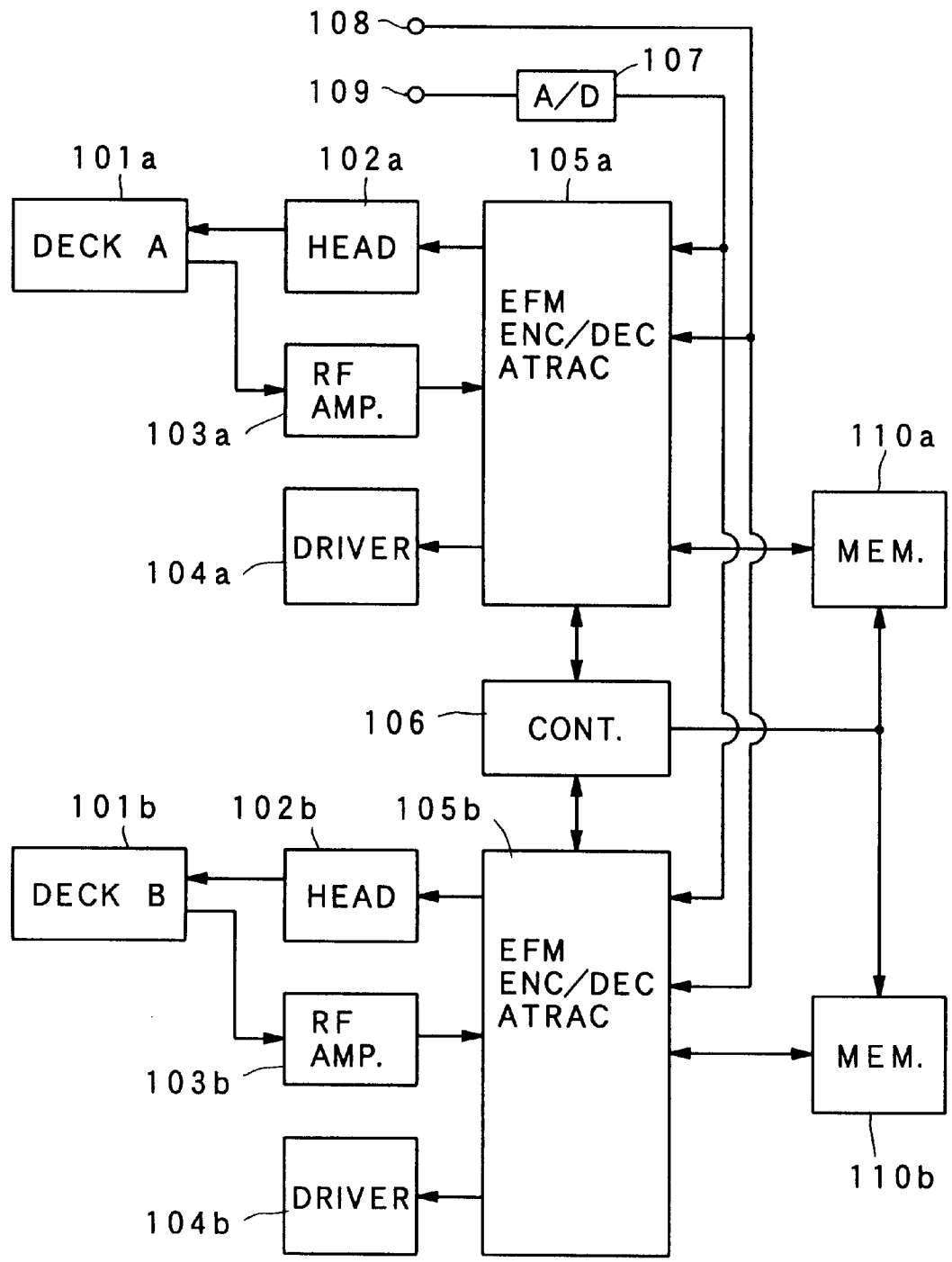
FIG. 2 is a block diagram illustrating a magneto-optical recording and reproducing apparatus according to an embodiment of the present invention.

FIG. 2 is a block diagram illustrating a magneto-optical recording and reproducing apparatus according to an embodiment of the present invention, wherein the basic configuration thereof is identical to the apparatus shown in FIG. 1. This apparatus is a so-called double deck type apparatus in which two recording and reproducing devices (MD decks) are employed.

The deck-A 101a and the deck-B 101b represent the respective mechanic portions and include information recording and reproducing pickups and other necessary components. The EFM encoder/decoder (ATRAC) 105a and 105b are under control of the common controller 106. The input terminal 108 is fed with a digital signal to be recorded, which is supplied to the EFM encoder/decoders 105a and 105b. The input terminal 109 is fed with an analog signal to be recorded, which is supplied to the EFM encoder/decoders 105a and 105b via the ADC 107. The memories 110a and 110b are controlled by the controller 106, and are used for producing UTOC (User's Table Of Contents) information or for the information recording described later.

According to the present invention, in the information recording and reproducing apparatus thus configured, the deck-A 101a and the deck-B 101b are operated to record information in timely parallel manner onto the discs inserted therein, respectively, and recording position (i.e., positions of the magnetic field modulation head and the optical head) of the information for the decks are automatically controlled at the transition (inter-song portion or dividing point of the songs) of the songs (programs), thereby making it possible to record information on plural recording media on the real-time basis without the interruption or break of the recorded information (songs).

FIGS. 3A to 3I schematically show the recording manner of the information on MDs according to the present invention. FIG. 3A shows a contents of an information source M to be recorded onto MDs, such as a CD (Compact Disc), which includes a plurality of programs (songs) to which corresponding addresses (song numbers) are applied. The information source M includes 6 programs, i.e., program-1 to program-6. Namely, the numbers shown in FIG. 3A represent the numbers of the programs (songs) included in the information source M. Each of FIGS. 3B to 3I shows a content of an MD on which information is recorded. FIGS. 3B and 3G show the recording conditions of the MD installed in the deck-A 101a, and FIGS. 3C-3F and 3H-3I show the recording conditions of the MD installed in the deck-B 101b. In FIGS. 3A to 3I, the lengths of the belts or combined boxes shown indicate the length in time of the programs or recorded contents. The horizontal length of belt in FIG. 3A indicates the total time of the programs recorded on the information source M (a certain CD in this example), and the horizontal lengths shown in FIGS. 3B to 3I indicate the total recordable time of a single MD to which the information on the information source M is to be copied. As appreciated, the information source M including 6 programs has a total recording time longer than the recordable time of a single MD. In FIGS. 3B to 3I, the status or operation such as REC (Recorded), DEL (Deleted) or OW (Over-Written) are described under the numbered boxes or blocks corresponding to the programs. The description "UTOC" indicates that the UTOC information is recorded. FIGS. 3A to 3F show, in combination, the information recording manner of a first information recording method according to the present invention, and FIGS. 3A and 3G to 3I show, in combination, the information recording manner of a second information recording method according to the present invention.

First, the description will be given of the first information recording method by referring to FIGS. 3A to 3F. In the first information recording method, the deck-A 101a successively records the information of the programs on the information source M to the MD in the deck-A. On the other hand, the deck-B 101b records the information of the programs on the information source M on the MD installed in the deck-B, in parallel in time with the recording by the deck-A 101a. However, every time when the deck-A or the deck-B detects the dividing point of the programs or the end of the program, it records the next program on the MD over the recording area where the previous program has been recorded (i.e., overwriting), after checking whether or not the program is completely recorded by the deck-A 101a. If it is detected that a certain program has not been completely recorded on the MD by the deck-A 101a due to the shortage of the remaining recording area, the deck-B 101b does not overwrite the next program over the previously recorded program, but records the next program on the MD to follow the previously recorded program. In this way, the programs on the information source M are successively recorded to the MD in the deck-A 101a, and when the remaining recording space becomes insufficient to completely record the next program, the programs are then successively recorded onto the MD in the deck-B.

This will be described with reference to FIGS. 3B to 3F. FIG. 3B shows information recording condition by the deck-A 101a, wherein the programs on the information source M are recorded onto the MD in the deck-A 101a. FIGS. 3C to 3F show information recording condition by the deck-B, wherein first the program-1 is recorded on the MD by the deck-B as shown in FIG. 3C in parallel in time with the recording of the same program by the deck-A 101a. Then, after confirming that the program-1 was completely recorded by the deck-A 101a, the program-2 is recorded over the program-1 as shown in FIG. 3D. In this manner, the overwriting over the previously recorded program is repeated until the MD in the deck-A becomes full.

If the MD in the deck-A becomes full and it is detected that a certain program (e.g., program-4 in FIG. 3B) was not completely recorded on the MD in the deck-A (i.e., the recording by the deck-A is terminated because of the shortage of the remaining recording area), the deck-B does not carry out overwriting but records the next program (e.g., program-5) on the MD to follow the program-4 as shown in FIG. 3F. Subsequently, the deck-B 101b continues the recording of the program-5 and program-6 and then records UTOC information after the program-6. In this way, the program-1 to program-3 are completely recorded on the MD in the deck-A 101a, and the program-4 to program-6 are completely recorded on the MD in the deck-B 101b, as illustrated. The program-4 whose recording was incomplete may be deleted from the MD in the deck-A 101a during the recording operation of the program-5 to program-6 by the deck-B 101b. Alternatively, the UTOC information for only the program-1 to program-3 may be recorded on the MD in the deck-A 101a, with the incompletely recorded portion of the program-4 remained as it is.

Next, the description will be given of the second information recording method with reference to FIGS. 3A and 3G to 3I, wherein the recording by the deck-B 101b is started after the recording by the deck-A 101a is continued for a predetermined time period or the remaining recordable area (or recording time) of the MD in the deck-A becomes less than a predetermined amount (or time). Namely, as shown in FIG. 3G, the deck-A 101a successively records the programs on the MD, and when it is detected that the recording portion on the MD reaches the point corresponding to the predetermined time m from the recording start position, the deck-B 101b starts recording the programs on the MD. In the example shown, the predetermined time m has passed during the recording of the program-3, and the deck-B 101b starts recording from the middle portion of the program-3.

After the start of recording programs, the deck-B 101b repeatedly performs overwriting on the previously recorded programs with confirming the complete recording of the program on the MD by the deck-A 101a until incomplete recording on the MD by the deck-A takes place, in the same manner as the aforementioned first information recording method. When the incomplete recording in the deck-A is detected, the deck-B 101b stops overwriting and executes successive recording of the subsequent programs as shown in FIG. 3I. According to the second information recording method described above, the deck-B does not have to execute unnecessary recording at the initial period of the recording in which the deck-A can execute the complete recording.

Next, the first and the second information recording methods will be described with reference to the flowcharts shown in FIGS. 4, 5A and 5B. The first information recording method will be described with reference to FIG. 4, and the second information recording method will be described with reference to FIGS. 5A and 5B. In the following description, the switching or the transfer of the successive recording from the deck-A to the deck-B, as described above, will be referred to as "relay mode".

First, the first information recording method will be described with reference to FIG. 4. When the relay mode begins (step S1), it is determined whether or not the MDs are set to both the deck-A 101a and the deck-B 101b (step S2). This may be determined by using the mechanical switches provided on the decks 101a and 101b. If the disc set to the deck is of playback only type, it may be detected by detecting the detection hole provided on the cartridge or by reading the TOC information recorded on the disc. If the disc is not set yet to at least one of the decks, the relay mode is canceled and the message indicating the absence of the disc is displayed (step S10). Then, the process ends (step S17).

If it is determined that both decks have discs therein, information recording starts on both the disc in the deck-A (hereinafter referred to as "disc-A") and the disc in the deck-B (hereinafter referred to as "disc-B") (step S3). Thereafter, it is determined whether or not the disc-A is full, i.e., has no remaining recording area (step S4). If the disc-A is full, the process goes to step S11. If the disc-A is not full, it is judged whether or not the inter-song portion or the dividing point of the songs is detected (step S5). If not, the process returns to step S4 to repeat the judgement until the dividing point is detected.

If the dividing point is detected in step S5, the deck-A prepares to record the next program subsequent to the previous program already recorded on the disc-A, and simultaneously the deck-B prepares to record the next program from the recording start position where the recording of the previous program has been started (i.e., overwriting) (step S6). In step S7, it is determined whether or not all programs on the information source M are completely recorded on the disc-A (here, term "complete" means that the program is recorded from its start to its end without interruption or break). If the step S7 results in No, the flag is set (step S9), and steps S3 to S7 are repeated. On the other hand, if the step S7 results in Yes, the deck-A records the UTOC information on the disc-A and the deck-B deletes the programs previously recorded thereon (step S8). Thus, the process ends (step S17). In this circumstance, all programs on the information source M are recorded on the disc-A with further recordable area remained on the disc-A. Namely, all programs on the information source M are completely copied to the single disc-A.

If it is detected in step S4 that the disc-A is full, it is determined whether or not the flag has been set (step S11).

If the flag has been set, i.e., the process has passed through step S9, the deck-A records the UTOC information on the disc-A and the deck-B continues recording subsequent programs on the disc-B (step S12). On the other hand, if the flag has not been set, the deck-A records the UTOC information on the disc-A and the deck-B continues the recording of the program from the recording start position on the disc-B where the recording has been started (step S13). In this case, the deck-B records the program from the contents just after the interruption of the recording by the deck-A onto disc-A.

Although the information is continuously being supplied to the deck-B during the transfer of the pickup of the deck-B to its recording start position, it may be temporarily stored in the memory (DRAM 12 in FIG. 1) and outputted with a certain delay time. Therefore, the information may be recorded on the disc-B from the portion just after the portion recorded at the end of the disc-A. Namely, if the flag has been set, it means that the dividing point has been detected, and the deck-B continues recording program from the next program on the disc-B. On the other hand, if the flag has not been set, it means that the program-1 is longer than the total recording time of the disc-A, or the program-1 does not have a clear dividing point or inter-song portion like the case of recording radio broadcasting program.

In the case of the digital recording of the information from a CD, the judgement in step S5 can be executed by detecting the change of the program (track) number obtained from the Q code recorded on the CD. In the case of analog recording from a cassette tape, the dividing point or the inter-song portion may be detected as the soundless portion between the songs.

After the execution of step S12 or step S13, it is judged whether or not the disc-B is full (step S14). If Yes, it is further judged whether or not all programs has been recorded (step S15). These steps are repeated until the disc-B becomes full or all programs are recorded, and then the deck-B records the UTOC information on the disc-B (step S16). Thus, the process ends (step S17).

Next, the description will be given of the second information recording method with reference to FIGS. 5A and 5B. In FIG. 5A, first it is detected whether or not the relay mode has been set (step S52). If No, the process keeps the waiting status until the relay mode is set. If the setting of the relay mode is detected, the process goes to step S53, wherein it is determined whether or not both disc-A and disc-B has been set. This determination may be executed in the same manner as step S2 described above. If step S53 results in No, the relay mode is cancelled and the message indicating the absence of the disc is displayed (step S66).

If the setting of the discs is detected, the deck-A starts recording (step S54). Then, the remaining recordable time t of the disc-A is detected, and the time t is compared with a predetermined remaining time m (e.g., 10 minutes) (step S5). If the time t is longer than the time m, the recording is continued. If the time t becomes shorter than the time m, the process goes to step S56, wherein it is again determined whether or not the disc-B is set. If No, the process goes to step S66 in which the relay mode is cancelled. If step S56 results in Yes, the remaining recordable time t of the disc-B is compared with the predetermined remaining time m (step S57). If step S57 results in No, the process goes to step S66 to cancel the relay mode. Then, the process ends (step S75). If step S57 results in Yes, the process goes to step S58 where the deck-B starts recording.

In step S59, it is detected whether or not the disc-A is full. If Yes, the process goes to step S67. If No, the process goes to step S60 wherein it is determined whether or not the dividing point or the inter-song portion of the songs is detected. If No, the process goes to step S59. On the other hand, if the dividing point or inter-song portion is detected, the deck-A prepares to continue recording of next program after the previously recorded program, and simultaneously the deck-B searches the recording start position of the previous program and prepares to record the next program from there (step S61).

If it is determined that the recording is not completed in step S62, the flag is set (step S73). Then, the deck-A continues the recording and the deck-B starts recording from the recording start position (step S74). Then, the process returns to step S59 to repeat the process after step S59. If step S62 results in Yes, the deck-A records the UTOC information on the disc-A and the deck-B deletes the information recorded on the disc-B (step S63). Thus, the process ends (step S75).

If step S59 results in Yes, it is determined whether or not the flag is set (step S67). If Yes, i.e., the process has passed through step S73, the deck-A records the UTOC information on the disc-A and the deck-B continues recording (step S68). On the other hand, if the flag has not been set, the deck-A records the UTOC information on the disc-A and the deck-B returns to the recording start position to restart the recording of the information from the portion just after the interrupted portion on the disc-A (step S69). It is noted that the judgment in step S60 is executed in the same manner as step S5 in FIG.

After the execution of step S68 or S69, it is determined whether or not the disc-B is full (step S70). If Yes, it is determined whether or not all programs have been recorded (step S71). If the disc-B becomes full or all programs are recorded, the deck-B records the UTOC information on the disc-B (step S72). Then, the process ends (step S75). If programs to be recorded are still remaining when the disc-B becomes full, the process may return to step S51 to repeat the process with the relationship of the disc-A and the disc-B being interchanged. In that case, it is necessary to pause the operation of both deck-A and deck-B so that new discs are set to the decks.

While the information cannot be recorded on the disc during the transfer of the pickup to the recording start position, it can be compensated for by using the memory or a signal delay, thereby enabling continuous recording of the program onto separate discs. The MD system employs data compression technique which compresses data amount to ⅕ of its original amount before recording the data, and hence the recording information requires only ⅕ of the real time recording. Therefore, the information supplied during the jump to the recording start position may be compressed and temporarily stored in the DRAM 12, thereby avoiding erroneous interruption or break of the recorded information. The data stored in the DRAM may of course be deleted after it is recorded on the disc.

It is noted that the magneto-optical recording and reproducing apparatus according to the present invention may be implemented as an apparatus equipped with two MD deck portions, known as "double deck " apparatus, or may be implemented as a system which includes plural MD decks connected to a common controller performing the function of the system controller shown in FIG. 2.

While the predetermined remaining time m is 10 minutes in the above embodiment, of course it is not limited to this. In addition, in stead of comparing the remaining times, the program number or address number may be predetermined so that the deck-B starts the recording when the number is detected.

As described above, according to the present invention, information is recorded on separate discs in parallel in time. Information is continuously and successively recorded on one of the discs while the recording position of the other one of the discs is returned back to its recording start position when the dividing point of the information or the inter-song portion is detected. When the one of the disc becomes full, the information is continuously and successively recorded on the other one of the discs without overwriting. Thereby, information may be recorded successively on separate discs with easy operation. Further, if the recording of the other one of the disc is started after the recording on the one of the discs is performed for a predetermined time or amount, the efficiency of the recording operation may be improved.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning and range of equivalency of the claims are therefore intended to embraced therein.

What is claimed is:

1. An information recording apparatus comprising:
   a receiving unit for receiving an information to be recorded on recording media, said information including a plurality of unit information;
   a first recording unit for recording the unit information successively on a first recording medium;
   a detecting unit for detecting dividing points of the unit information; and
   a second recording unit for recording the unit information on a second recording medium, said second recording unit recording the unit information from a recording start position of the second recording medium every time when the detecting unit detects the dividing points.

2. An apparatus according to claim 1, wherein said second recording unit records the unit information by overwriting a new unit information over the unit information which has been recorded on the second recording medium.

3. An apparatus according to claim 1, further comprising a confirming unit for confirming that the unit information is completely recorded on the first recording medium, wherein said second recording unit starts recording the unit information after the confirmation by the confirming unit is made.

4. An apparatus according to claim 1, wherein said first recording unit and said second recording unit start recording simultaneously.

5. An apparatus according to claim 1, further comprising a determining unit for determining that the first recording medium becomes full by the recorded unit information, said second recording unit recording the unit information successively one after another after the said determining unit determines that the first recording medium becomes full.

6. An apparatus according to claim 1, wherein said second recording unit starts recording when a remaining recordable amount of the first recording medium becomes less than a predetermined amount.

7. An apparatus according to claim 1, wherein said second recording unit starts recording when a remaining recordable time of the first recording medium becomes less than a predetermined time.

8. A method of recording information on recording media comprising the steps of:
   (a) receiving information including a plurality of unit information;
   (b) simultaneously starting recording of the unit information on a first recording medium and a second recording medium from recording start positions of the, first recording medium and the second recording medium, respectively;
   (c) detecting dividing points of the unit information; and
   (d) moving a recording position of the unit information on the second recording medium to the recording start position of the second recording medium to record next unit information from the recording start position every time when the detecting step detects the dividing points.

9. A method according to claim 8, further comprising the step of confirming that the unit information is completely recorded on the first recording medium, said moving step moving the recording position on the second recording medium to the recording start position after the confirmation is made by the confirming step.

* * * * *